June 19, 1923.

W. E. PRINDLE

DRIER

Filed Sept. 18, 1919

1,459,254

2 Sheets-Sheet 2

Inventor
William E. Prindle.

By C. C. Shepherd.
Attorney

Patented June 19, 1923.

1,459,254

UNITED STATES PATENT OFFICE.

WILLIAM E. PRINDLE, OF COLUMBUS, OHIO.

DRIER.

Application filed September 18, 1919. Serial No. 324,492.

*To all whom it may concern:*

Be it known that WILLIAM E. PRINDLE, a citizen of the United States, residing at Columbus, in the county of Franklin and State of Ohio, has invented certain new and useful Improvements in Driers, of which the following is a specification.

This invention relates broadly to desiccating machinery, and has for an object to provide a rotary drier in which economy of heat and efficiency are provided and the possibility of the materials passed therethrough being scorched or burnt is reduced to a minimum.

Another object of the invention resides in the provision of a structure for economically and efficiently withdrawing the moist vapors from wet material by the application of heat thereto, and to provide a rotary shell into which material to be dried is introduced and conducted longitudinally thereof, and to provide a longitudinally extending tube within the shell through which the heat from a suitable furnace circulates and which passes entirely through said shell so that the material will be dried by radiant heat only and not brought in direct contact with the heat flowing through the shell, the object of this structure being to prevent the material from being scorched, or similarly injured.

A further object of the invention resides in an improvement upon the construction disclosed in my prior Patent No. 1,222,244, April 10, 1917, and the improvement resides essentially in continuing the inner cylinder of the drier, which communicates with the furnace, throughout the entire length of the outer cylindrical casing, through which the material being dried passes, and in this manner to effect the desiccation of the material without bringing the same into direct contact with the heat of the furnace.

A further object of the invention rests in providing improved means for introducing heat into the inner cylinder at the point adjacent to the material discharging end of the outer cylinder, so that the heat at this point will be radiated in such manner as to avoid injury to the substantially dry material.

Figure 1:
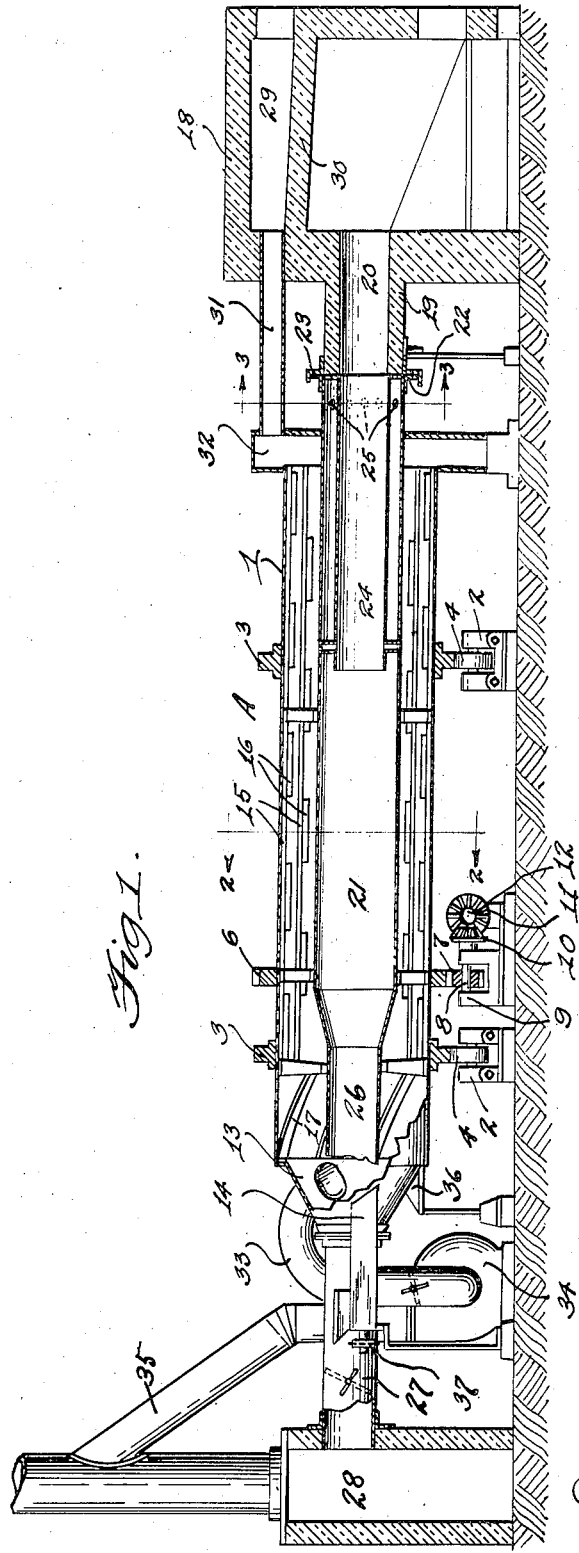

Further objects of my invention will appear from the further detailed description of the structure illustrated in the accompanying drawings, in which similar characters of reference designate corresponding parts, and in which, Figure 1 is a vertical longitudinal sectional view taken through a drier of the rotary type constructed in accordance with the principles of the invention.

Figure 2:
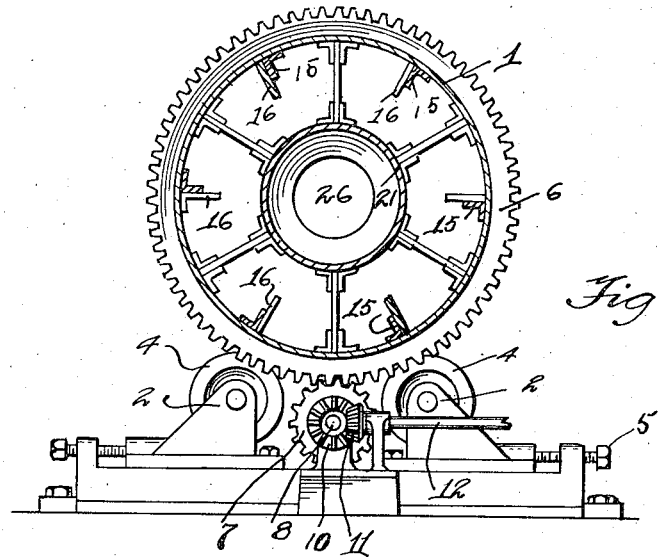
Figure 3:
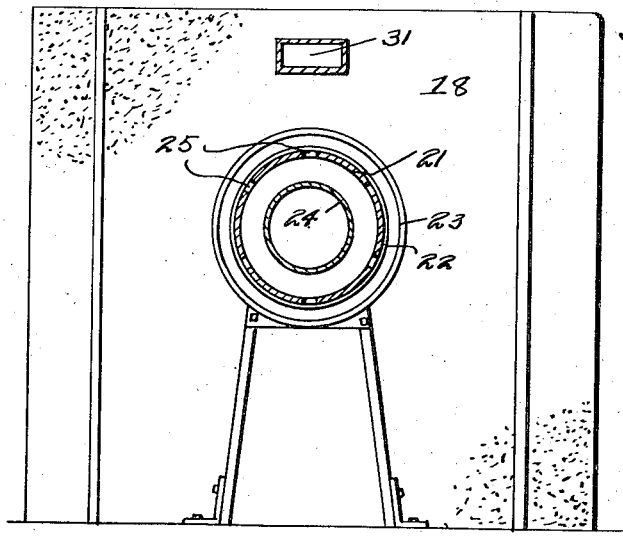

Figure 2 is a vertical transverse sectional view taken along the line 2—2 of Figure 1, and, Figure 3 is a similar view taken along the line 3—3 of Figure 1.

The drier A comprising the present invention is particularly adapted for service in the drying of sensitive materials without allowing the products of combustion to come into direct contact with the material during the drying process, and wherein a heat flue is so arranged that there will be no leakage of smoke or soot, the products of combustion passing entirely through the drier surrounding the flue and being discharged into the stack. The retained heat from the arch of the furnace is admitted to the back end of the drier which supplies the necessary dry air to allow the exhaust fan to create a circulation to carry away the vapors from the drying material.

To this end, the invention comprises an outer cylinder 1 which is preferably formed from relatively thin sheet metal and is supported for rotation by means of anti-friction bearings 2. In carrying out this construction, the cylinder 1 is equipped with annular tires 3, which engage with spaced rollers 4 suitably supported within the bearings 2. The bearings are preferably adjustable in a lateral direction by means of the set screw structure 5, whereby the balance and alignment of the cylinder 1 can be readily controlled. The bearings 2 are preferably located in appropriately longitudinally spaced positions, and in this manner serve to effect the true rotational support of the cylinder. Obviously, the number of supporting bearings may be varied to accord with the general length of the drier. The cylinder 1 is mounted so as to assume a slightly inclined longitudinal position, and is rotated by providing the same with a fixed gear 6, the latter meshing with a pinion 7, which in turn is mounted upon a short shaft section 8, the latter being journaled in a suitable bearing 9. A beveled gear 10 is fixed to the outer end of the shaft 8 and meshes with a similar gear 11 located upon a transversely extending shaft 12. Power may be imparted to the shaft 12 in any suitable manner and it will be seen that upon the rotation thereof, corresponding but slower movement will be imparted to the cylinder.

The forward end of the cylinder 1 is provided with a vapor bonnet 13, which communicates with a feeding hopper 14, whereby upon the insertion of the material to be dried into said hopper, the same will be introduced into the interior of the cylinder 1. The interior of said cylinder is provided with a plurality of lifting or cascading blades 15, formed by longitudinally extending angle members which are symmetrically spaced, and whose radial legs are provided at suitable intervals with plates 16, which are located in staggered relation. Curved spiral blades 17 are located between the bonnet 13 and the blades 15 and assist in conveying the material toward the agitating members 15 and 16 and to prevent the same from accumulating within or adjacent to the bonnet 13.

In the rear portion of the drier there is provided a source of heat which in this instance has been illustrated in the form of a furnace 18. This furnace may be adapted to burn any suitable type of fuel such as coal, oil or gas, as will be clearly understood. The rear of the furnace is provided with an offset 19 through which a heat conducting passageway 20 extends, the latter communicating with the combustion chamber of the furnace so that the heat of the latter will be drawn off of said furnace by way of the passageway.

Extending longitudinally through the cylinder 1 is an inner cylinder or flue 21, which latter passes entirely through, without interruption, the outer cylinder 1, and the rear end of said inner cylinder is provided with an annular angle member 22, the latter being rotatably received within a metallic bearing 23 located upon the outer end of the offset 19. Situated within the cylinder 21 is a tube 24, which is suitably supported to maintain its axial position with respect to the cylinder 21. And it will be noted that said tube is of a lesser diameter than the cylinder in which it is placed in order to maintain the said parts in spaced relation. In this manner, heat passing from the furnace will be first introduced into the tube 24 before the same gains access into the cylinder 21 proper, and by this construction the heat radiating from the cylinder 21 at the discharge end of the outer cylinder 1 will be prevented from scorching or burning the substantially dry material. To further insure this feature, the cylinder 21 is provided with a series of annularly arranged openings 25 which permit of the introduction of atmospheric air into the cylinder 21 at the point surrounding the tube 24. In this manner said tube will have its heat reduced to such an extent that the same will be prevented from injuring the dry material.

The heat radiating surface of the inner cylinder is reduced at the point adjacent to the inlet end of the cylinder 1 in order that the heat contained in said cylinder at the inlet end of the drier may be concentrated to better advantage and not distributed over a substantially wide area thus accommodating the flue to the reduction in heat. This reduced end 26 of the flue passes through the bonnet 13 and communicates with a short pipe section 27 which has its outer end mounted within a stack 28, through which the products of combustion are led from the drier.

In order to withdraw the vapors arising from the drying material, the furnace setting 18 is provided with a chamber 29 which is separated by the usual arch 30 from the combustion chamber of the furnace, air being introduced into this chamber 29 so that the same will be heated by the action of the furnace. A conduit 21 leads from the chamber 29 and is connected with a discharge hood 32 located at the discharge end of the cylinder 1 and into which the dried material passes so that the same may be suitably collected.

At the inlet end of the drier there is connected a pipe 33 leading to a suction fan 34. And the other end of this fan is connected by means of a pipe 35 with the stack 28. It will be seen that upon the operation of the fan 34, air will be drawn through the cylinder 1 by way of the source of air supply leading from the chamber 29, and this air will be passed through the cylinder 1 so as to collect the vapors contained therein and to discharge the moisture from the drier by way of the fan.

From the foregoing description taken in connection with the accompanying sheet of drawing, it will be observed that the present invention provides a drier wherein the material being desiccated is only subject to radiant heat and at no point does it come in contact with the direct heat of the furnace 18. This construction results in the provision of a drier which is excellently capable of drying such materials as high grade butter and cheese salt, paint materials which would be discolored by the direct heat, and numerous other sensitive chemicals and materials which are capable of withstanding the moderate heat from the inner flue or cylinder. Again there are many conditions where the demand for drying is not excessive, and in such cases the drier disclosed will be particularly adapted to the requirements. It will be observed that the radiated heat from the arch of the furnace is admitted to the back end of the drier which supplies the necessary dry air to allow the exhaust fan to create a circulation so as to carry away the vapors from the drying material. By the provision of the inner tube 24, a circulation of air obtains between said tube and the adjacent portions of the cylinder 21, and in this manner the intense heat of the delivery end of the furnace 18 is sufficiently mitigated to prevent injury to the substantially dry materials passing into the discharge hood 32. The bonnet 13 is preferably mounted upon a fixed standard 36, which prevents the rotation of said bonnet and enables the latter to rotatably receive the inlet end of the cylinder 1. The hopper 14 may be provided with a sprocket 37 to effect the operation of its conveyor mechanism. Suitable radial braces may be employed for connecting and spacing the outer and inner cylinders 1 and 21 respectively.

In view of the foregoing, it is believed that the operation and construction of the present invention will be clearly understood by those versed in the art, and therefore, a more extended explanation has been accordingly omitted.

I claim:

1. A rotary drier comprising an outer cylinder, means for supporting and rotating said cylinder, delivery and discharge mechanisms cooperative with the ends of said cylinder for effecting the passage of material to be dried therethrough, a longitudinally extending inner cylinder situated axially within said outer cylinder and formed to pass completely through and beyond the latter, a furnace for introducing heat into said inner cylinder and a tube situated within one end of said inner cylinder and in spaced relation from the latter, said tube being in free communication with said furnace and with the interior of said inner cylinder and means for introducing air into said inner cylinder so as to reduce the heat between the latter and said tube.

2. A rotary drier comprising an outer cylinder, means for supporting and rotating said cylinder, delivery and discharge mechanism cooperative with the ends of said cylinder for effecting the passage of material to be desiccated therethrough, agitating blades situated within said cylinder, an inner cylinder positioned axially within said outer cylinder and extending completely through the latter, a tube located within said inner cylinder and in spaced relation from the latter, and a furnace operating to introduce heat into said tube and into said inner cylinder, whereby the heat of said furnace will be introduced into contact with said material by radiation only.

3. A drier comprising an outer cylinder, an inner cylinder located in and spaced from the outer cylinder, and means for simultaneously revolving both cylinders as a single unit, a main and an auxiliary source of heat supply, means for leading heat from the main source into the inner cylinder, and means for leading heat from the auxiliary source of supply into the outer cylinder and around the inner cylinder, the latter source of heat supply serving to dislodge vapors within the outer cylinder.

In testimony whereof I affix my signature.

WILLIAM E. PRINDLE.